United States Patent
Speck et al.

(10) Patent No.: US 7,202,859 B1
(45) Date of Patent: Apr. 10, 2007

(54) CAPACITIVE SENSING PATTERN

(75) Inventors: Don A. Speck, Santa Clara, CA (US); Gareth J. McCaughan, Cambridge (GB); Bob L. Mackey, San Jose, CA (US)

(73) Assignee: Synaptics, Inc., San Jose, CA (US)

( * ) Notice: Subject to any disclaimer, the term of this patent is extended or adjusted under 35 U.S.C. 154(b) by 740 days.

(21) Appl. No.: 10/216,557

(22) Filed: Aug. 9, 2002

(51) Int. Cl.
*G09G 5/00* (2006.01)

(52) U.S. Cl. .................. 345/174; 345/173; 345/175

(58) Field of Classification Search ........ 345/173, 345/177, 174, 156, 157; 178/18, 19, 18.01, 178/19.03, 18.06
See application file for complete search history.

(56) References Cited

U.S. PATENT DOCUMENTS

| | | | | |
|---|---|---|---|---|
| 4,293,987 A * | 10/1981 | Gottbreht et al. | .......... | 29/25.42 |
| 4,550,221 A | 10/1985 | Mabusth | ....... | 178/18 |
| 4,550,310 A | 10/1985 | Yamaguchi et al. | ........ | 340/365 |
| 4,578,654 A * | 3/1986 | Tait | ............. | 333/175 |
| 4,733,222 A | 3/1988 | Evans | ............. | 340/365 C |
| 4,990,725 A * | 2/1991 | Mizzi | ............. | 178/18.05 |
| 5,051,545 A * | 9/1991 | McDermott | .......... | 178/18.07 |
| 5,384,497 A * | 1/1995 | Britton et al. | ............. | 326/44 |
| 5,408,055 A * | 4/1995 | Harris et al. | ............. | 178/19.07 |
| 5,463,388 A | 10/1995 | Boie et al. | .......... | 341/33 |
| 5,521,336 A | 5/1996 | Buchanan et al. | .......... | 178/18 |
| 5,541,652 A | 7/1996 | Jackson et al. | .......... | 348/332 |
| 5,933,102 A | 8/1999 | Miller et al. | .......... | 341/33 |
| 6,140,975 A | 10/2000 | Cohen | ............. | 343/846 |
| 6,147,680 A | 11/2000 | Tareev | ............. | 345/173 |
| 6,188,391 B1 * | 2/2001 | Seely et al. | ............. | 345/173 |
| 6,256,022 B1 | 7/2001 | Manaresi et al. | .......... | 345/174 |
| 6,297,811 B1 | 10/2001 | Kent et al. | ............. | 345/173 |
| 6,762,753 B2 * | 7/2004 | Satoh et al. | ............. | 345/177 |
| 6,768,484 B2 * | 7/2004 | Sano et al. | ............. | 345/173 |

\* cited by examiner

*Primary Examiner*—Albert Decady
*Assistant Examiner*—Fritz Alphonse

(57) ABSTRACT

A capacitive sensor is disclosed. The capacitive sensor comprises a plurality of spaced-apart X traces disposed along an X axis and a plurality of spaced-apart Y traces disposed along a Y axis with each of the Y traces forming a single crossing with each of the X traces. The X traces and the Y traces are arranged in an intertwined pattern about each crossing. The X traces and the Y traces are insulated from each other.

53 Claims, 6 Drawing Sheets

CAPACITIVE SENSING PATTERN

BACKGROUND

The present invention relates to capacitive sensors, and more particularly, to the geometry of the capacitive sensors.

Touch-sensing devices, such as touch screens and touch pads, can include capacitive sensors that determine the location of an object proximate to the sensing device. The signals sensed by the capacitive sensors change with the object's presence and location relative to the sensors. For example, capacitive touch-sensing devices that employ a matrix of row and column electrodes as sensors can detect changes caused by the object in the capacitive coupling either between row and column electrodes, or between electrodes and a virtual ground.

In all capacitive touch-sensing devices, it is desirable to achieve the maximum resolution possible with the minimum number of row and column electrodes. Designs which achieve the minimum number of electrodes allow reduced amounts of sensing electronics or allow the same amount of sensing electronics to be used to create a larger sensing area.

Some touch-sensing devices utilize a simple array of sensors formed from rows and columns of straight electrodes with relatively uniform width. A problem with this configuration is that when an object that is small relative to the electrode spacing moves across the touch sensor, the detected signal on specific electrodes will have abrupt changes as the object moves from one electrode line to the next. For example, the object may begin entirely over on a first electrode line, and then next move into the space between this first electrode and a second electrode, and then move to entirely over the second electrode line. The abrupt signal changes that will occur are not optimal and may yield in uneven or rough pointing behavior.

Prior-art electrode geometries include traces of interconnected diamond patterns used in capacitive touch-sensing devices, as disclosed in U.S. Pat. No. 4,550,221. An alternate design has also been described in U.S. Pat. No. 6,147,680. However, the prior art designs still suffer from cross-axis performance problems. These problems are particularly encountered when the number of electrodes used to cover a given area of touch surface becomes too low. For example, if diamond patterns are used, as the number of electrodes used to cover a given area is decreased, the size of each diamond must be increased. If the size of individual diamonds in the pattern begins to approach the size of the object or finger to be sensed, loss of signal in one of the two sensor axes can lead to unsuitable loss of smooth pointing behavior. The same problem can occur with the more complex pattern disclosed in U.S. Pat. No. 6,147,680. An additional disadvantage of the pattern disclosed in the '680 patent is that it requires multiple crossings between each electrode aligned along one direction and each electrode aligned along the orthogonal direction. These multiple crossings can easily result in undesirably high levels of capacitive coupling between the sensor electrodes.

Another prior-art sensor pattern design is shown in FIG. 1. To differentiate between different electrodes in the drawing figures herein, distinct electrodes may be represented as dashed or solid lines of differing widths for convenience of viewing, this pattern is used on the Zytouch sensor available from Zytronic PLC, of Tyne & Wear, England. Like the pattern of the sensor in the '680 patent, this pattern employs multiple crossings that can easily result in undesirably high levels of capacitive coupling between the sensor electrodes.

SUMMARY

The drawbacks and disadvantages of the prior art are overcome by the capacitive sensing pattern of the present application.

A capacitive touch-sensor is disclosed. The capacitive touch-sensor comprises a plurality of spaced-apart X sensor traces (electrodes) disposed along an X axis and a plurality of spaced-apart Y sensor traces (electrodes) disposed along a Y axis. The traces (electrodes) may be in the form of conductive material as employed on printed circuit boards, thin wires embedded in glass, conductors printed on flexible substrates, or may take other forms. Each of the Y traces forms a single crossing with each of the X traces. The X traces and the Y traces are insulated from each other at the crossings. The X traces and the Y traces are arranged in an intertwined pattern about each crossing.

Another embodiment of a capacitive touch-sensor is disclosed. The capacitive touch-sensor comprises a plurality of spaced-apart X traces disposed along an X axis and a plurality of spaced-apart Y traces disposed along a Y axis. Each of the Y traces forms a single crossing with each of the X traces. The X traces and the Y traces are arranged in an intertwined pattern about each crossing and are disposed on opposite faces of an insulating substrate.

Another embodiment of a capacitive sensor is disclosed. The capacitive touch-sensor comprises a plurality of spaced-apart X traces disposed along an X axis and a plurality of spaced-apart Y traces disposed along a Y axis. Each of the Y traces forms a single insulated crossing with each of the X traces. The X traces and the Y traces are arranged in an intertwined pattern about each crossing and are disposed together on a face of an insulating substrate. The crossings may be formed using conductive jumpers formed over regions of insulating material.

Another embodiment of a capacitive touch-sensor is disclosed that comprises a plurality of spaced-apart X traces disposed along an X axis and a plurality of spaced-apart Y traces disposed along a Y axis. Each of the Y traces forms a single crossing with each of the X traces. The X traces and the Y traces are arranged in an intertwined pattern about each crossing and are disposed together on a face of an insulating substrate.

Another embodiment of a capacitive touch-sensor is disclosed that comprises a plurality of spaced-apart X traces disposed along an X axis and a plurality of spaced-apart Y traces disposed along a Y axis. Each of the Y traces forms a single crossing with each of the X traces. The X traces and the Y traces are arranged in an intertwined pattern about each crossing. The X traces are disposed on a first insulating substrate and the Y traces are disposed on a second insulating substrate.

BRIEF DESCRIPTION OF THE FIGURES

Referring now to the figures, wherein like elements are numbered alike.

DETAILED DESCRIPTION

Those of ordinary skill in the art will realize that the following description of the present invention is illustrative only and not in any way limiting. Other embodiments of the invention will readily suggest themselves to such skilled persons.

The family of geometric patterns disclosed herein consists of intertwined double spiral traces. The design is comprised of an intertwined pattern of a plurality of spaced-apart traces along an X axis and a plurality of spaced-apart traces along a Y axis, and forming crossings when the traces along the X axis cross the traces along the Y axis. The traces along the X axis and the Y axis are insulated from each other. In one embodiment, the intertwined double spiral (which may consist of counterclockwise spirals having N segments connected to clockwise spirals having N segments in one exemplary embodiment) electrodes sense motion in each axis. The intertwined double spiral traces along the X and Y axes can be disposed on separate faces of an insulating substrate. In other embodiments, the intertwined double spiral traces are disposed along the X and Y axes on the same layer or the same face of an insulating substrate. The number of turns (i.e., the resulting size and trace lengths) of the double spiral traces is dependent upon the desired design.

Figure 1:
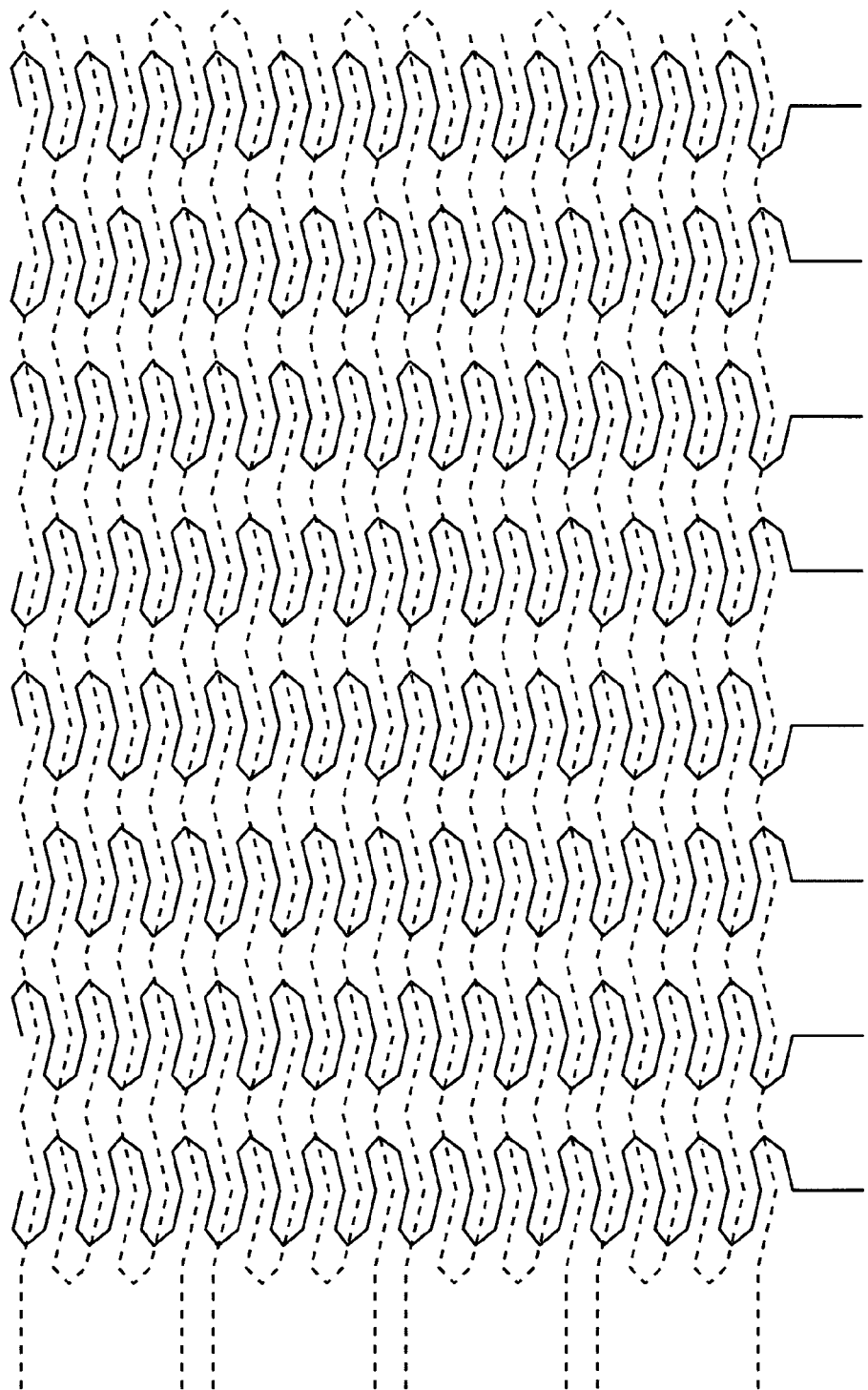
FIG. 1 is a diagram illustrating a prior-art capacitive sensor.
Figure 2:
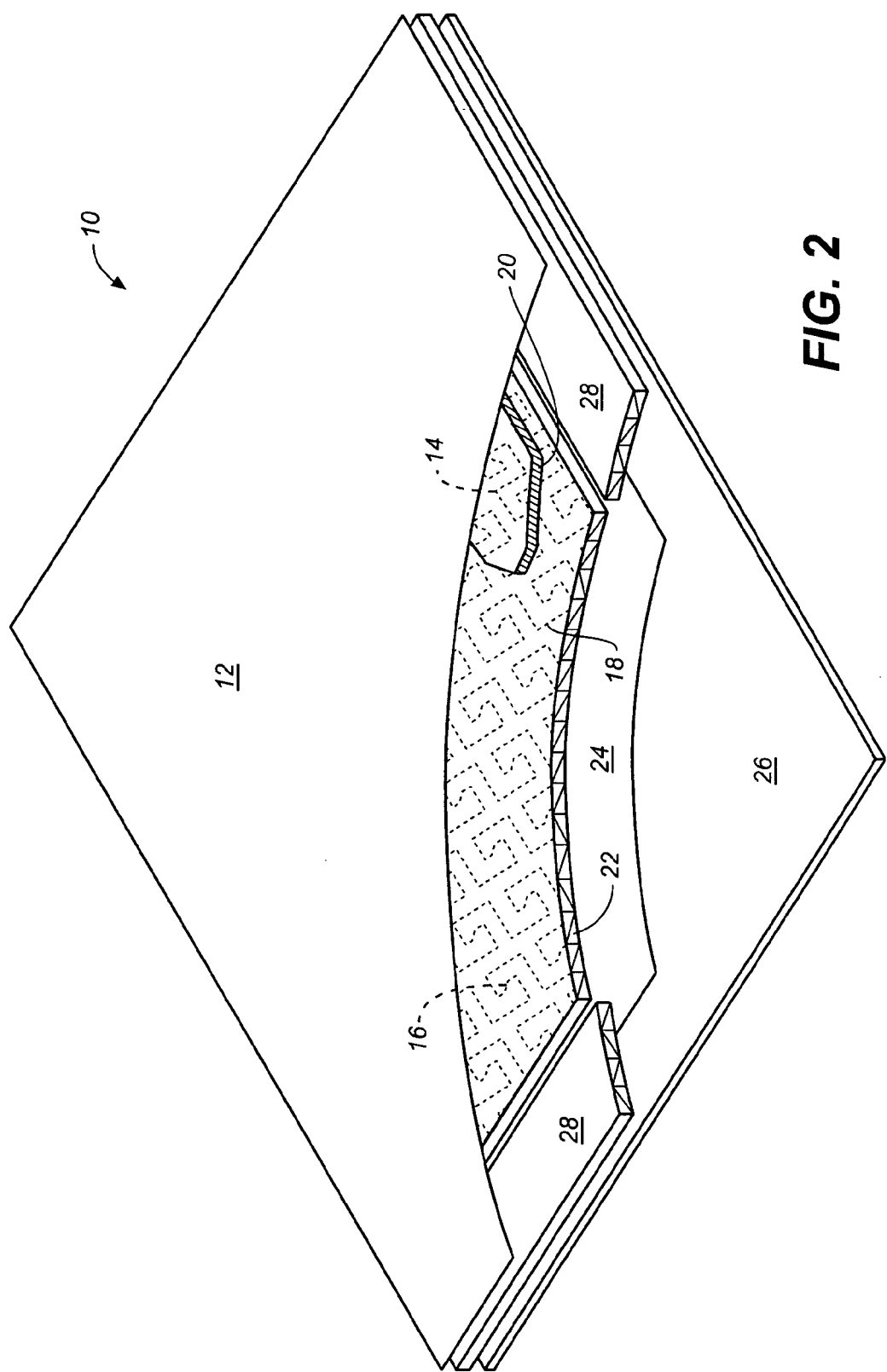
FIG. 2 is a diagram illustrating a partially broken away view of an embodiment of a capacitive sensor illustrating the different layers.

FIG. 2 illustrates a capacitive touch-sensor 10 encompassing an intertwined pattern of traces. The pattern of electrodes is comprised of an intertwined pattern of spiraling traces. There can be several trace patterns, including but not limited to: double spirals, counterclockwise inward spirals connected to clockwise outward spirals, clockwise inward spirals connected to counterclockwise outward spirals, counterclockwise inward spirals having N segments connected to clockwise outward spirals having N segments; or clockwise inward spirals having N segments connected to counterclockwise outward spirals having N segments. The number of segments (N) is an integer. The number N, length and width of each segment, can be varied according to the requirements of the sensor being designed. The shape of each segment can be substantially straight or can be curved to achieve a spiral design.

The capacitive touch-sensor 10 includes a top, protective insulating layer 12 upon which an object, such as a finger or a stylus, will come into proximity or direct contact. A series of traces (e.g. 14) are disposed (along a X axis) of a trace matrix 16. A series of traces (e.g. 18) are disposed (along a Y axis) of a trace matrix 16 and are insulated from traces 14 by insulating layer 20. Another insulating substrate 22 separates the matrix from a ground plane 24, which is mounted on the printed circuit board 26. The active area of the capacitive touch-sensor 10 is mounted within a border area 28.

Figure 3:
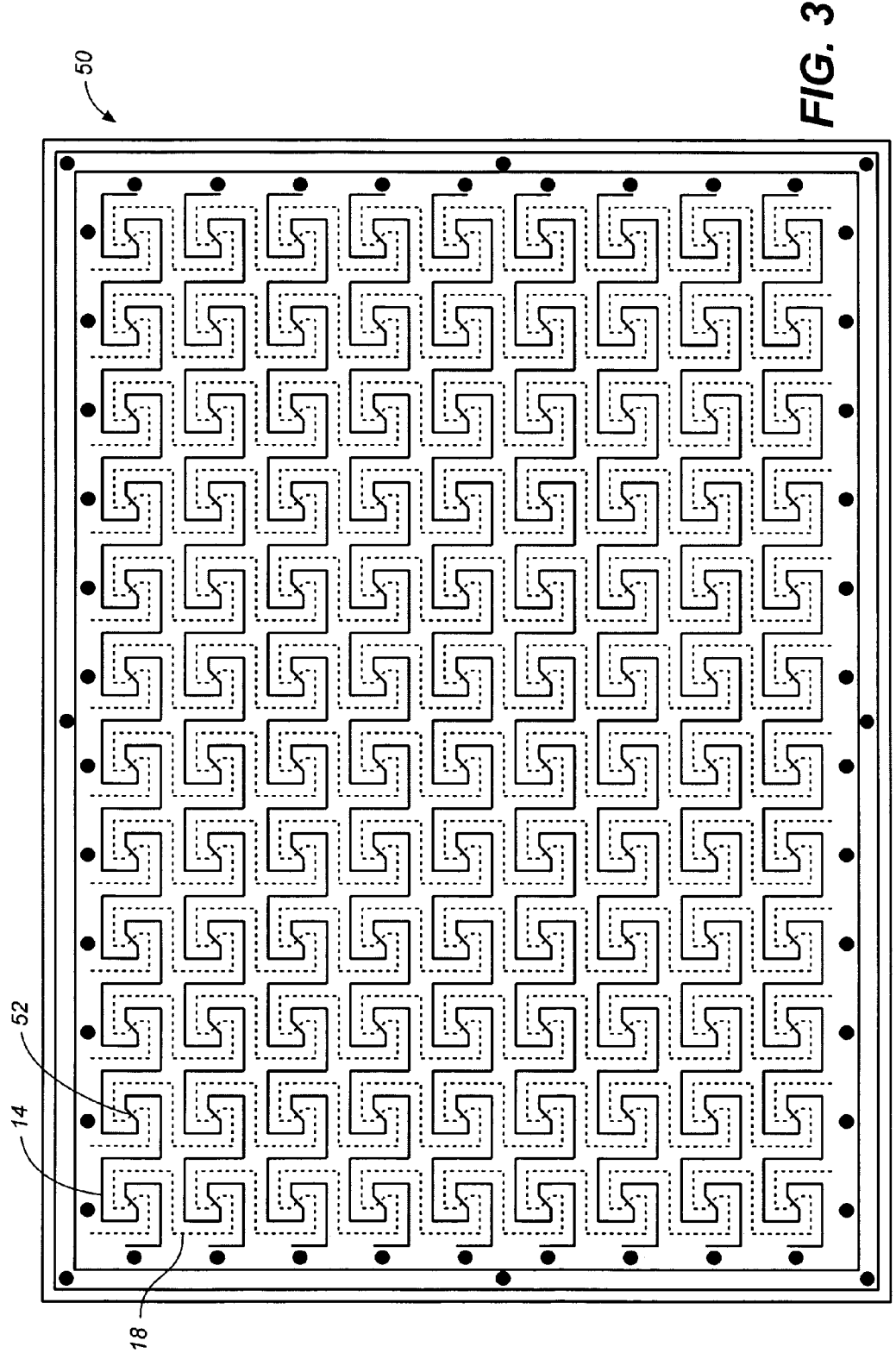
FIG. 3 is a diagram illustrating an embodiment of a capacitive sensor.

FIG. 3 illustrates a first illustrative embodiment of a capacitive touch-sensor having an exemplary pattern of traces. A pattern (or trace matrix) 50 is created by the intertwined double spiral design of traces disposed along the X axis and traces disposed along the Y axis. Each double spiral trace (e.g., 14) along the X axis is intertwined with each neighboring interconnected double spiral trace (e.g., 18) along the Y axis. In this embodiment, the X and Y traces are disposed on opposite faces of an insulating substrate 20, as illustrated in FIG. 2. The insulating substrate serves two purposes: it insulates the traces from one another, and reduces transcapacitance between the X axis traces and the Y axis traces by separating the traces.

Referring again to FIG. 3, at least one of the traces 14 and 18 include a thinned region in which the traces 14 and 18 cross each other at an intersection (or a crossing) 52. In this embodiment, conductive contact between the traces is avoided by the presence of the insulating substrate 20, as shown in FIG. 2, between the traces. As illustrated in FIG. 3, the crossing 52 of the two traces 14 and 18 forms an "x". At the crossing, at least one of the two traces 14 and 18 can be substantially thinner than the remaining portion of the traces 14 and 18.

In operation, an object moving along the X axis, from the left edge to the right edge across the trace matrix 50, will experience a capacitive coupling with trace 18 that first increases smoothly and then decreases smoothly. The magnitude of this capacitive coupling can be used to estimate the position of the object along the X axis. The magnitude of this coupling will also be largely unaffected by the position of the object along the Y axis. Thus, the measured position of the object along the X axis will vary smoothly and will be independent of its position along the Y axis.

Figure 4:
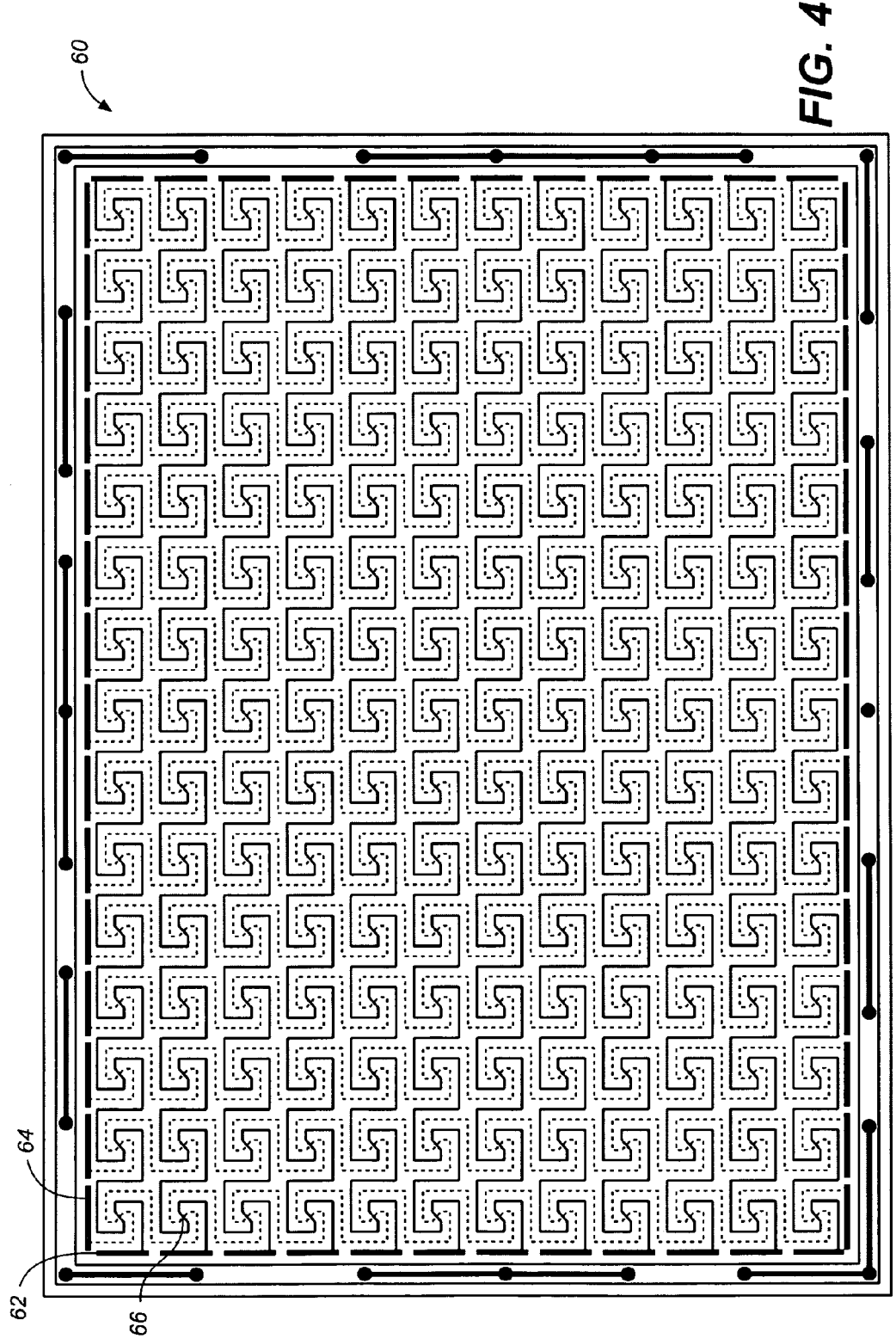
FIG. 4 is a diagram illustrating another embodiment of a capacitive sensor.

A capacitive touch-sensor comprising an alternative pattern is illustrated in FIG. 4. In this embodiment, the individual trace 62 disposed along the X axis and trace 64 disposed along the Y axis form an intertwined double spiral design. Unlike the first embodiment illustrated in FIG. 2, the X axis trace 62 and the Y axis trace 64 of FIG. 4 are disposed on the same face of the insulating substrate. Since the traces 62 and 64 are intertwined and disposed on the same face of the substrate, there is a point at which they must cross. However, the traces 62 and 64 must be insulated from one another in order for the sensor to operate properly. One method to prevent shorts between the traces 62 and 64 is to interpose an insulating layer between traces 62 and 64. This method disposes traces 62 and 64 on layers electrically insulated from each other, so that traces 62 and 64 can be insulated from one another at the crossing 66. Alternatively, a conductive jumper can be employed. For example, at this crossing 66, one of the traces (e.g., trace 64 along the Y axis) stops just prior to the crossing, while the other trace (e.g., trace 62 along the X axis) has a portion, which may be thinned, that continues through the crossing 66 in the double spiral design.

Figure 5:
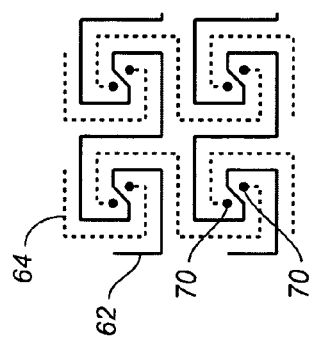
FIG. 5 is a diagram illustrating a partial detailed plan view of FIG. 4.

Referring to FIG. 5, in order to continue the connection of trace 64, holes (or vias) 70 are formed in the sensor on either side of trace 62 near the crossing. The holes 70 may be placed through, wired, or contain other conductive material to connect trace 64 without contacting trace 62. Alternatively, insulating material may be placed over trace 62 at the crossing 66 and a conductive ink (e.g., a carbon filled ink or silver ink) can be disposed on top of the insulating material, connecting trace 64 across crossing 66.

In operation, an object moving along the X axis, from left edge to the right edge across the trace matrix 60, will experience a capacitive coupling with trace 64 that first increases smoothly and then decreases smoothly. The magnitude of this capacitive coupling can be used to estimate the position of the object along the X axis. The magnitude of this coupling will be largely unaffected by the position of the object along the Y axis. Thus, the measured position of the object along the X axis will vary smoothly and will be independent of its position along the Y axis.

Figure 6:
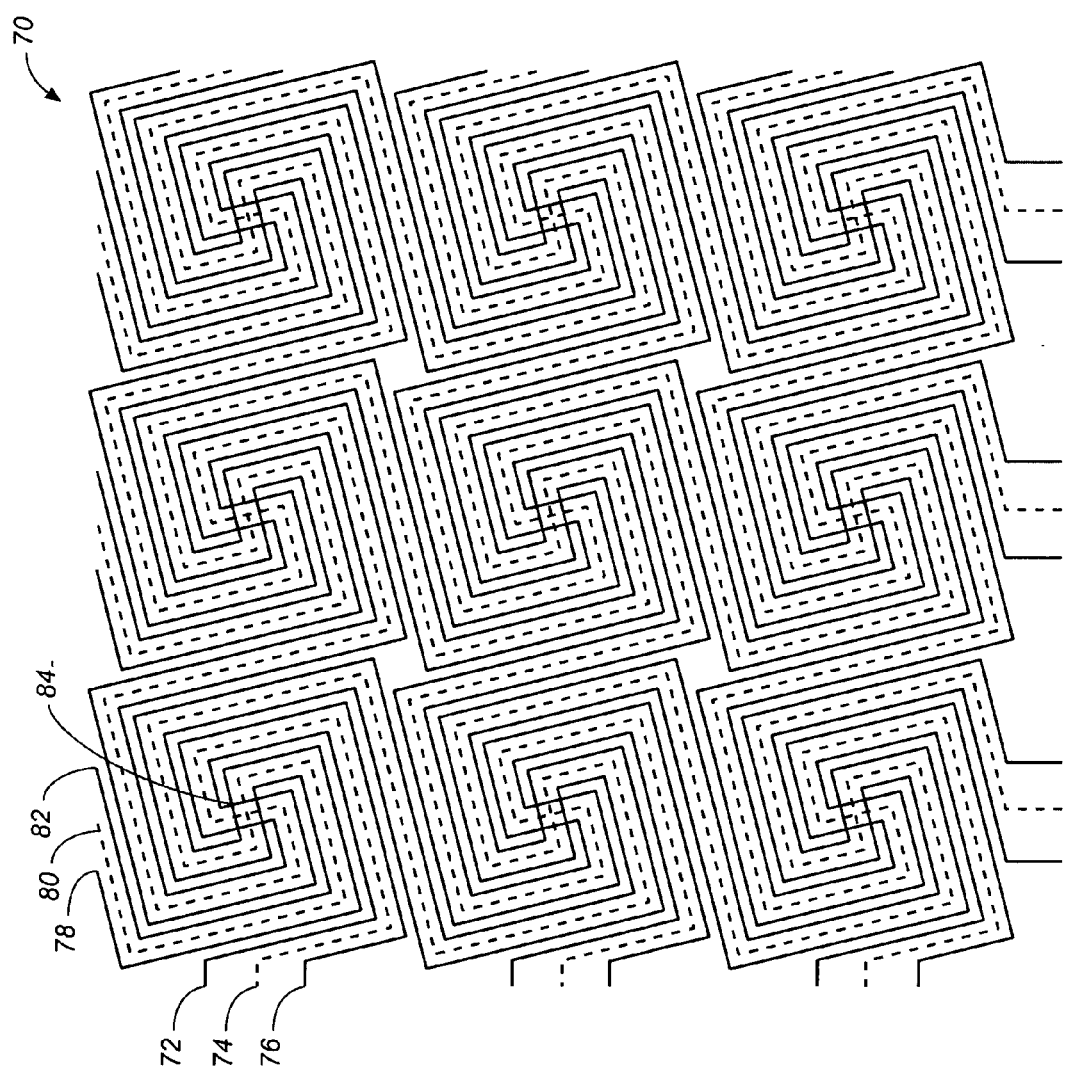
FIG. 6 is a diagram illustrating another embodiment of a capacitive sensor.

A capacitive touch-sensor formed in an alternative pattern is illustrated in FIG. 6. In this embodiment, the trace matrix 70 is shown including three X traces 72, 74, 76 disposed along the X axis and three Y traces 78, 80, 82 disposed along the Y axis in an intertwined double spiral design.

In this embodiment, the X traces (e.g. traces 72, 74, 76) and the Y traces (e.g. traces 78, 80, 82) are grouped in triples and are disposed on opposing faces of an insulating substrate (e.g., insulating substrate 20, as illustrated in FIG. 2). Other embodiments contemplated can include any number of X and Y traces in a group or in trace matrix 70. Yet other embodiments contemplated can include the number of X traces being different from the number of Y traces in a group or in trace matrix 70. Grouping traces in this manner can allow individual traces of the group to be arbitrarily narrow relative to the size of the spiral, which may be desirable for reasons including, and not limited to: cost, ease of manufacture, availability of fabrication expertise or equipment, availability of material and components, and specific sensor design. For example, one may want to design a touch-sensor which glows, or a touch screen through which a display can be viewed. One desirable property of a grouping of thin traces is to enable the overall trace matrix to pass light around individual traces, while still allowing the group as a whole to have sufficient surface area to achieve the desired sensitivity. Persons of ordinary skill in the art will recognize that the number of X and Y traces may be arbitrary and that the number of traces utilized is dependent upon the desired size and shape of the capacitive sensor.

Referring again to FIG. 6, the X traces 72, 74, 76 and the Y traces 78, 80, 82 are intertwined and the X traces 72, 74, 76 and the Y traces 78, 80, 82 cross each other at each crossing (e.g., crossing 84, where X trace 72 crosses Y trace 78). In this embodiment, electrical contact between the traces is prevented by the presence of the insulating substrate 20 between the traces. As illustrated in FIG. 6, each crossing (e.g., 84) of two traces (e.g., 72 and 78) forms an "x". At each crossing, at least one of the two traces 72 and 78 may be substantially thinner than the remaining portion of the traces 72 and 78. Other conventional circuit-board techniques can be utilized at the cross-over point to prohibit electrical contact between the traces, as stated above.

In operation, an object moving along the X axis from the left edge to the right edge across the trace matrix 70 will experience a capacitive coupling with traces 78, 80, 82, which increases smoothly and then decreases smoothly. The magnitude of this capacitive coupling can be used to estimate the position of the object along the X axis. The magnitude of this coupling will be largely unaffected by the position of the object along the Y axis. Thus, the measured position of the object along the X axis will vary smoothly and will be independent of its position along the Y axis.

Figure 7:
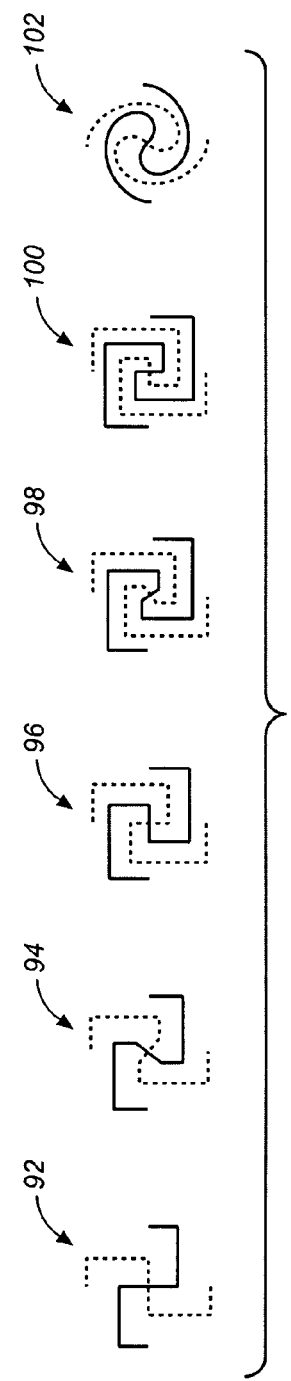
FIG. 7 is a diagram illustrating a family of sensor designs.

A family of sensor designs is illustrated in FIG. 7. Each of these of sensor designs 92, 94, 96, 98, 100 and 102 illustrates a sensor cell representing a single crossing of X and Y traces in the sensor pattern. The number of segments in the spiral pattern can be increased or decreased, being dependent upon the desired design and design constraints or advantages. Alternatively, rather than being composed of discrete straight segments as shown in sensor designs 92–100, the spiral pattern can be formed as a continuous smooth curve as shown in sensor design 102 or as any combination of straight and curved sections. In each of the embodiments shown, the sensor traces may be formed at a uniform width, or may comprise extremely fine wires or other conductive material in transparent touch screens. Alternatively, the width of the traces is thinned at the crossings to avoid excessive transcapacitance between the crossing traces.

Another embodiment includes a design in which the X and Y traces are disposed on the same face of the substrate with an insulating material, such as an adhesive or air, disposed between the X and Y traces. Another embodiment includes a design in which the X traces and the Y traces are disposed on a same face of an insulating substrate and the Y traces crosses the X traces at each of the crossings using a conductive jumper. Other embodiments can include a design in which the X and Y traces are disposed on two separate insulating substrates.

The embodiments described herein have many advantages. As the number of electrodes used to cover a given area is decreased, increasing the number of turns in the pattern can prevent the loss of signal in one of the two sensor axes. This allows fewer electrodes and associated sensing electronics to be used to cover a given sensing area.

There are several additional advantages to the disclosed patterns. For example, each of the traces do not branch, which allows for easy end to end continuity testing to verify the pattern integrity in production. This is particularly advantageous in high volume production of touch sensors. Further, the design fills the available space for maximum signal acquisition.

While the present invention has been described with reference to exemplary embodiments, it will be understood by those skilled in the art that various changes may be made and equivalents may be substituted for elements thereof without departing from the scope of the present invention. In addition, many modifications may be made to adapt a particular situation or material to the teachings without departing from the essential scope thereof. Therefore, it is intended that the present invention not be limited to the particular embodiments disclosed as the best mode contemplated for carrying out this present invention, but that the present invention will include all embodiments falling within the scope of the appended claims.

What is claimed is:

1. A capacitive sensor comprising:
   a plurality of spaced-apart X traces disposed along an X axis;
   a plurality of spaced-apart Y traces disposed along a Y axis and insulated from said X traces, each of said Y traces forming a single crossing with each of said X traces; and
   wherein said X traces and said Y traces are arranged in an intertwined pattern about each said crossing.

2. The capacitive sensor of claim 1, wherein said intertwined pattern is counterclockwise inward spirals connected to clockwise outward spirals.

3. The capacitive sensor of claim 1, wherein said intertwined pattern is a double spiral.

4. The capacitive sensor of claim 1, wherein said intertwined pattern is clockwise inward spirals connected to counterclockwise outward spirals.

5. The capacitive sensor of claim 1, wherein said intertwined pattern is counterclockwise inward spirals having N segments connected to clockwise outward spirals having N segments, wherein both of said N segments are the same number.

6. The capacitive sensor of claim 1, wherein said intertwined pattern is clockwise inward spirals having N segments connected to counterclockwise outward spirals having N segments, wherein both of said N segments are the same number.

7. The capacitive sensor of claim 1, wherein said X traces are disposed on a first insulating substrate and said Y traces are disposed on a second insulating substrate.

8. The capacitive sensor of claim 1, wherein said X traces and said Y traces are disposed on a same face of an insulating substrate.

9. The capacitive sensor of claim 8, wherein an insulating material is disposed between said X traces and said Y traces.

10. The capacitive sensor of claim 1, wherein said X traces and said Y traces are disposed on opposing faces of an insulating substrate.

11. The capacitive sensor of claim 1, wherein said Y traces cross said X traces at each said crossing using a conductive jumper.

12. The capacitive sensor of claim 1, wherein said X traces and said Y traces have a substantially uniform width.

13. The capacitive sensor of claim 1, wherein at least one of said X traces and said Y traces have a thinner width at each said crossing.

14. The capacitive sensor of claim 1, wherein said X traces and said Y traces are arranged in groups of more than one trace.

15. A capacitive sensor comprising:
   a plurality of spaced-apart X traces disposed along an X axis;
   a plurality of spaced-apart Y traces disposed along a Y axis, each of said Y traces forming a single crossing with each of said X traces;
   wherein said X traces and said Y traces are arranged in an intertwined pattern about each said crossing; and
   wherein said X traces and said Y traces are disposed on opposing faces of an insulating substrate.

16. The capacitive sensor of claim 15, wherein said intertwined pattern is a double spiral.

17. The capacitive sensor of claim 15, wherein said intertwined pattern is counterclockwise inward spirals connected to clockwise outward spirals.

18. The capacitive sensor of claim 15, wherein said intertwined pattern is clockwise inward spirals connected to counterclockwise outward spirals.

19. The capacitive sensor of claim 15, wherein said intertwined pattern is counterclockwise inward spirals having N segments connected to clockwise outward spirals having N segments, wherein both of said N segments are the same number.

20. The capacitive sensor of claim 15, wherein said intertwined pattern is clockwise inward spirals having N segments connected to counterclockwise outward spirals having N segments, wherein both of said N segments are the same number.

21. The capacitive sensor of claim 15, wherein said X traces and said Y traces have a substantially uniform width.

22. The capacitive sensor of claim 15, wherein at least one of said X traces and said Y traces has a thinner width at each said crossing.

23. The capacitive sensor of claim 15, wherein said X traces and said Y traces are arranged in groups of more than one trace.

24. A capacitive sensor comprising:
   a plurality of spaced-apart X traces disposed along an X axis;
   a plurality of spaced-apart Y traces disposed along a Y axis, each of said Y traces forming a single crossing with each of said X traces;
   wherein said X traces and said Y traces are arranged in an intertwined pattern about each said crossing;
   wherein said X traces and said Y traces are disposed on a same face of an insulating substrate; and
   wherein said Y traces cross said X traces at each said crossing using a conductive jumper.

25. The capacitive sensor of claim 24, wherein said intertwined pattern is a double spiral.

26. The capacitive sensor of claim 24, wherein said intertwined pattern is counterclockwise inward spirals connected to clockwise outward spirals.

27. The capacitive sensor of claim 24, wherein said intertwined pattern is clockwise inward spirals connected to counterclockwise outward spirals.

28. The capacitive sensor of claim 24, wherein said intertwined pattern is counterclockwise inward spirals having N segments connected to clockwise outward spirals having N segments, wherein both of said N segments are the same number.

29. The capacitive sensor of claim 24, wherein said intertwined pattern is clockwise inward spirals having N segments connected to counterclockwise outward spirals having N segments, wherein both of said N segments are the same number.

30. The capacitive sensor of claim 24, wherein said X traces and said Y traces have a substantially uniform width.

31. The capacitive sensor of claim 24, wherein at least one of said X traces and said Y traces has a thinner width at each said crossing.

32. The capacitive sensor of claim 24, wherein an insulting material is disposed between said X traces and said Y traces.

33. The capacitive sensor of claim 24, wherein said X traces and said Y traces are arranged in groups of more than one trace.

34. A capacitive sensor comprising:
   a plurality of spaced-apart X traces disposed along an X axis;
   a plurality of spaced-apart Y traces disposed along a Y axis, each of said Y traces forming a single crossing with each of said X traces;
   wherein said X traces and said Y traces are arranged in an intertwined pattern about each said crossing; and
   wherein said X traces and said Y traces are disposed on a same face of an insulating substrate.

35. The capacitive sensor of claim 34, wherein said intertwined pattern is a double spiral.

36. The capacitive sensor of claim 34, wherein said intertwined pattern is counterclockwise inward spirals connected to clockwise outward spirals.

37. The capacitive sensor of claim 34, wherein said intertwined pattern is clockwise inward spirals connected to counterclockwise outward spirals.

38. The capacitive sensor of claim 34, wherein said intertwined pattern is counterclockwise inward spirals having N segments connected to clockwise outward spirals having N segments, wherein both of said N segments are the same number.

39. The capacitive sensor of claim 34, wherein said intertwined pattern is clockwise inward spirals having N segments connected to counterclockwise outward spirals having N segments, wherein both of said N segments are the same number.

40. The capacitive sensor of claim 34, wherein said X traces and said Y traces have a substantially uniform width.

41. The capacitive sensor of claim 34, wherein at least one of said X traces and said Y traces have a thinner width at each said crossing.

42. The capacitive sensor of claim 34, wherein said Y traces along said Y axis cross said X traces along said X axis at each said crossing using a conductive jumper.

43. The capacitive sensor of claim 34, wherein an insulting material is disposed between said X traces and said Y traces.

44. The capacitive sensor of claim 34, wherein said X traces and said Y traces are arranged in groups of more than one trace.

45. A capacitive sensor comprising:
  a plurality of spaced-apart X traces disposed along an X axis;
  a plurality of spaced-apart Y traces disposed along a Y axis, each of said Y traces forming a single crossing with each of said X traces;
  wherein said X traces and said Y traces are arranged in an intertwined pattern about each said crossing; and
  wherein said X traces are disposed on a first insulating substrate and said Y traces are disposed on a second insulating substrate.

46. The capacitive sensor of claim 45, wherein said intertwined pattern is a double spiral.

47. The capacitive sensor of claim 45, wherein said intertwined pattern is counterclockwise inward spirals connected to clockwise outward spirals.

48. The capacitive sensor of claim 45, wherein said intertwined pattern is clockwise inward spirals connected to counterclockwise outward spirals.

49. The capacitive sensor of claim 45, wherein said intertwined pattern is counterclockwise inward spirals having N segments connected to clockwise outward spirals having N segments, wherein both of said N segments are the same number.

50. The capacitive sensor of claim 45, wherein said intertwined pattern is clockwise inward spirals having N segments connected to counterclockwise outward spirals having N segments, wherein both of said N segments are the same number.

51. The capacitive sensor of claim 45, wherein said X traces and said Y traces have a substantially uniform width.

52. The capacitive sensor of claim 45, wherein at least one of said X traces and said Y traces have a thinner width at each said crossing.

53. The capacitive sensor of claim 45, wherein said X traces and said Y traces are arranged in groups of more than one trace.

* * * * *